(12) United States Patent
Arienti et al.

(10) Patent No.: US 11,332,105 B2
(45) Date of Patent: May 17, 2022

(54) BRAKING SYSTEM FOR VEHICLES, IN PARTICULAR FOR CYCLES AND MOTORCYCLES, AND ACTUATION METHOD FOR A BRAKING SYSTEM

(71) Applicant: FRENI BREMBO S.P.A., Curno (IT)

(72) Inventors: Roberto Arienti, Curno (IT); Andrea Odoni, Curno (IT); Massimo Gualandris, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 16/967,175

(22) PCT Filed: Feb. 6, 2019

(86) PCT No.: PCT/IB2019/050941
§ 371 (c)(1),
(2) Date: Aug. 4, 2020

(87) PCT Pub. No.: WO2019/155371
PCT Pub. Date: Aug. 15, 2019

(65) Prior Publication Data
US 2021/0070264 A1 Mar. 11, 2021

(30) Foreign Application Priority Data

Feb. 9, 2018 (IT) .......................... 102018000002543

(51) Int. Cl.
*B60T 8/17* (2006.01)
*B60T 8/171* (2006.01)
(Continued)

(52) U.S. Cl.
CPC ............ *B60T 8/1706* (2013.01); *B60T 8/171* (2013.01); *B60T 8/176* (2013.01); *B60T 8/3225* (2013.01);
(Continued)

(58) Field of Classification Search
CPC ...... B60T 8/1706; B60T 8/171; B60T 8/3225; B60T 8/176; B60T 2270/10; B60T 2201/03
See application file for complete search history.

(56) References Cited

U.S. PATENT DOCUMENTS

| 4,653,815 A | 3/1987 | Agarwal et al. |
| 4,957,331 A | 9/1990 | Burton et al. |
| (Continued) |

FOREIGN PATENT DOCUMENTS

| DE | 3322422 A1 | 1/1985 |
| EP | 0297797 A1 | 1/1989 |
| (Continued) |

OTHER PUBLICATIONS

European Patent Office, International Search Report with Written Opinion, issued in PCT/IB2019/050941, dated Mar. 15, 2019, 18 pages, European Patent Office, Rijswijk, Netherlands.

*Primary Examiner* — Vishal R Sahni
(74) *Attorney, Agent, or Firm* — Marshall & Melhorn, LLC

(57) ABSTRACT

A braking system for vehicles may have a pilot pump fluidically connected to a hydraulic actuator device. The hydraulic actuator device has a by-pass, configured to connect or disconnect fluidically a first actuation chamber and a delivery duct, where a movable septum is connected to a motor device. The movable septum places the first actuation chamber in communication with the by-pass and with a second actuation chamber, to a braking correction condition. The motor device is activated to translate the movable septum so that the first actuation chamber is fluidically separated from the by-pass and from the second actuation chamber. The second actuation chamber, fluidically connected to the delivery duct, controls the actuation of the (Continued)

braking device, excluding the action imposed by the user through the fluid under pressure in the first actuation chamber.

25 Claims, 7 Drawing Sheets

(51) Int. Cl.
  *B60T 8/176* (2006.01)
  *B60T 8/32* (2006.01)
(52) U.S. Cl.
  CPC ....... *B60T 2201/03* (2013.01); *B60T 2270/10* (2013.01)

(56) References Cited

U.S. PATENT DOCUMENTS

| | | | |
|---|---|---|---|
| 5,273,346 | A | 12/1993 | Tsuchida et al. |
| 10,464,541 | B2 * | 11/2019 | Arienti .................... B60T 8/404 |
| 2017/0028973 | A1 * | 2/2017 | Arienti ...................... B62L 3/08 |

FOREIGN PATENT DOCUMENTS

| | | |
|---|---|---|
| EP | 0518375 A2 | 12/1992 |
| EP | 3124344 A1 | 2/2017 |
| JP | S638058 A | 1/1988 |

* cited by examiner

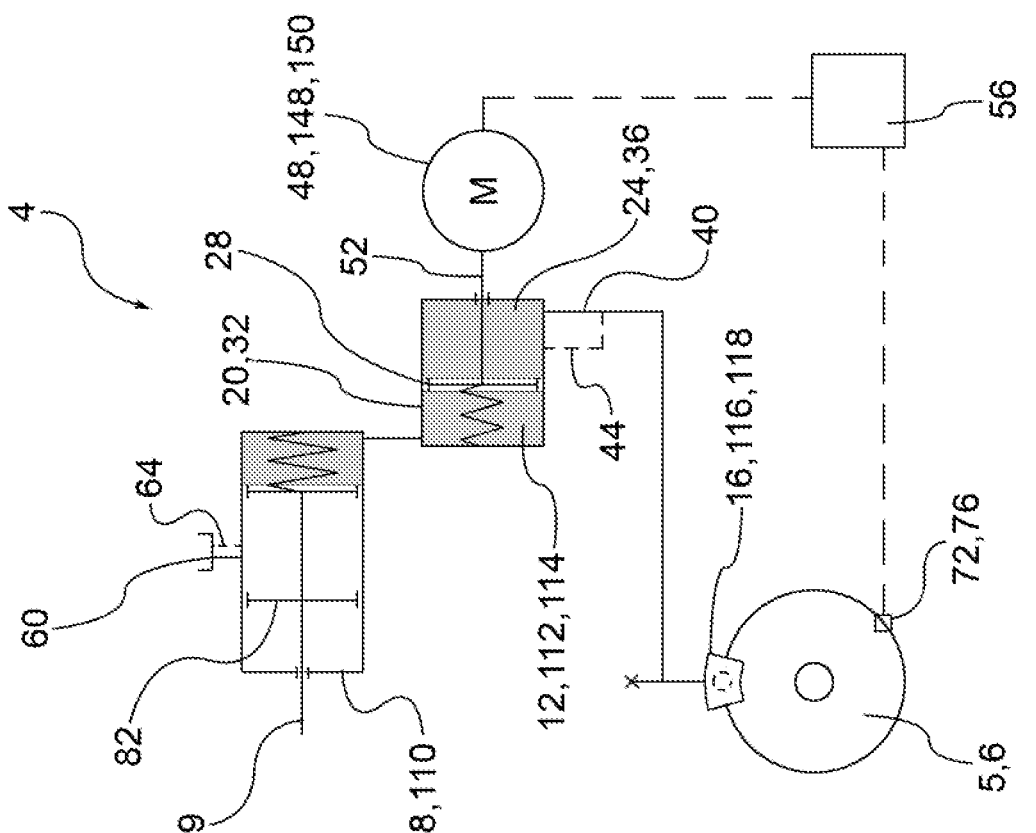
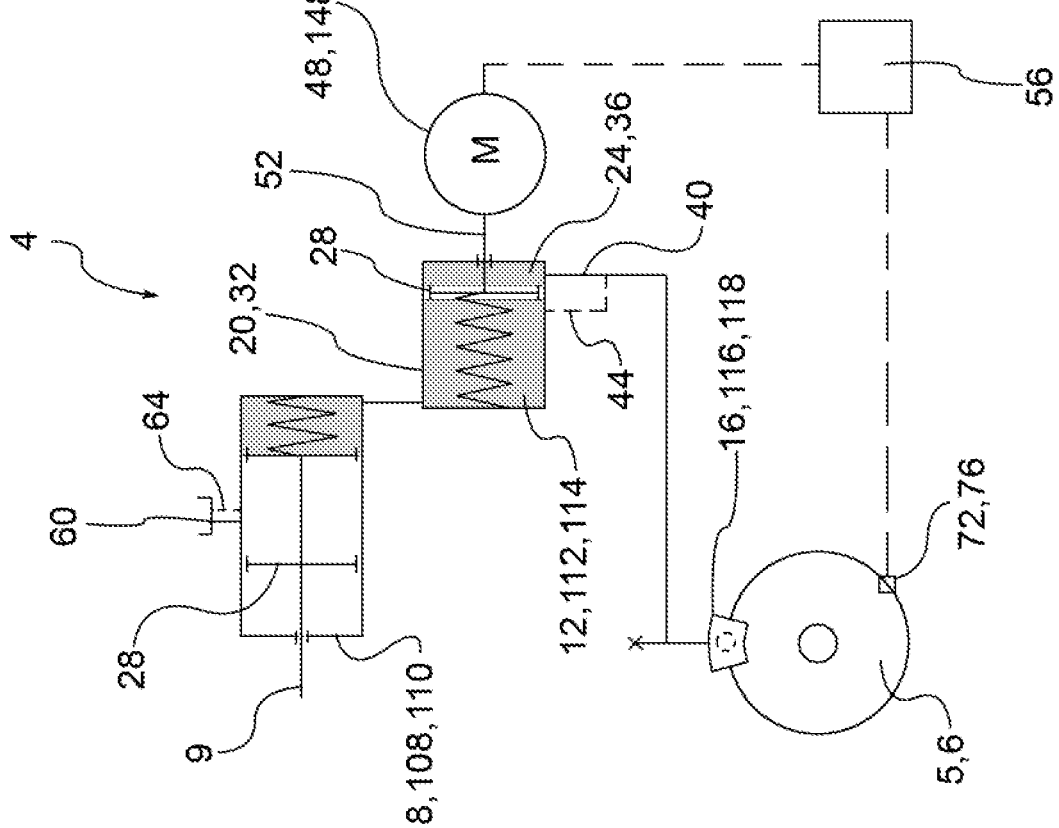
FIG.4b
FIG.4a

BRAKING SYSTEM FOR VEHICLES, IN PARTICULAR FOR CYCLES AND MOTORCYCLES, AND ACTUATION METHOD FOR A BRAKING SYSTEM

SCOPE

The present invention concerns a braking system for vehicles and the actuation method of a braking system for vehicles.

STATE OF THE ART

In particular, in the vehicle sector, in particular two-wheeled vehicles such as cycles and motorcycles, the use of mechanically and hydraulically operated braking systems is well known.

Braking systems for cycles and motorcycles of the known type do not always provide for anti-lock devices for the wheels or, in any case, braking correction devices to improve the stability of the vehicle. For example, the need to improve the stability of the vehicle may occur in the event of an incipient loss of control over the stability of the vehicle, for example in the event of a possible turning over, or lifting of the rear wheel, or in the event of misalignment between the front and rear wheels.

PRESENTATION OF THE INVENTION

To solve the cited problems, no specific solutions have been adopted in the art to date, leaving the action of controlling the braking and dynamics of the vehicle to the user, especially in the case of cycles.

The reason for this choice lies both in the reduced performance of the cycles, for example when compared to motorcycles, and in the need to contain the costs of the same cycles.

However, users do not always have the necessary sensitivity to intervene appropriately and promptly by correcting the braking action on one or more wheels.

Moreover, the cycles of the known art allow ever higher performances to be reached, due to the reduction of the mass and/or to the use of pedaling assistance systems.

Brake correction systems have been used in the motorcycle sector, but these are rather expensive and complex to implement, especially for applications on 'light' motorcycles.

Furthermore, the known systems do not allow the delivery pressure value of the brake fluid to be controlled precisely during all steps of the braking correction, whereby the control of vehicle stability is not always optimal.

The need is therefore increasingly felt to resolve the drawbacks and limitations cited with reference to the known art.

Such a requirement is satisfied by a braking system for vehicles according to claim 1 and by an actuation method of a vehicle braking system according to claim 1.

In particular, such a requirement is satisfied by a braking system for vehicles comprising:
- a pilot pump equipped with manual actuation means, lever—and/or pedal-operated, which is fluidically connected to a hydraulic actuator device, which is operatively connected to a braking device associated with a wheel of said vehicle,
- wherein the hydraulic actuator device delimits a first and a second actuation chamber separated fluidically by a septum, movable in an axial direction,
- wherein the first actuation chamber delimits a first volume which contains fluid pressurized by the pilot pump via the manual actuation means,
- wherein the second actuation chamber delimits a second volume which contains pressurized fluid, and is equipped with a delivery duct fluidically connected to said braking device, characterized in that the hydraulic actuator device comprises a by-pass, configured to fluidically connect or disconnect the first actuation chamber and the delivery duct, the movable septum is connected to motor means so that it may translate axially, regardless of the braking action imposed by the pilot pump via the manual actuation means, the system comprising a control unit operatively connected to said motor means and programmed to pass from a standard operating or deactivation condition of the motor means, wherein the movable septum puts the first actuation chamber in communication with the second actuation chamber and with the delivery duct, in a braking correction condition wherein the motor means are activated to translate the movable septum so that the first actuation chamber is fluidically separated from the delivery duct, and so that the second actuation chamber is fluidically connected to the delivery duct to control the actuation of the braking device via the pressure fluid contained in the second actuation chamber, wherein the movable septum comprises a collar and a stem, the collar realizing the hydraulic separation between the first and second actuation chamber, the stem passing through said first and second actuation chamber and being operatively connected to the motor means.

According to a possible embodiment, a diameter of the collar is greater than a diameter of the stem, said diameters being measured on a cross-section plane perpendicular to the axial direction.

According to a possible embodiment, a first diameter of the stem in the first actuation chamber is equal to a second diameter of the stem in the second actuation chamber.

According to a possible embodiment, said first and second stem diameters belong respectively to a first and second portion of the stem having axial extension, parallel to the axial direction, not less than an axial stroke of the movable septum.

According to a possible embodiment, the stem and/or the collar are collectively sized so that, following the axial stroke of the movable septum, there is no difference between the reduction of volume available in the first actuation chamber and the increase in volume in the second actuation chamber.

According to a possible embodiment, said movable septum is configured so that the pressure in the first actuation chamber is always higher than or equal to the pressure in the second actuation chamber.

According to a possible embodiment, said movable septum comprises an elastically deformable lip type gasket to guarantee said pressure difference between the first and second actuation chambers.

According to a possible embodiment, the collar comprises an annular seat that houses said gasket.

According to a possible embodiment, the movable septum is equipped with a compensating valve calibrated so that the pressure in the first actuation chamber is always higher than or equal to the pressure in the second actuation chamber.

According to a possible embodiment, the compensation valve comprises an obturator configured so as to ensure that the pressure in the first actuation chamber is always higher than or equal to the pressure in the second actuation chamber.

According to a possible embodiment, said obturator is equipped with a stop and elastic calibration means that elastically influence said stop to rest on a contrast pin.

According to a possible embodiment, said obturator is equipped with a stop and elastic calibration means that elastically influence said stop to rest against a conical surface.

According to a possible embodiment, the hydraulic actuator device is configured so that, in the rest or non-operating condition and in the standard operating condition, the obturator does not occlude the by-pass so as to allow the fluidic connection between said first and second actuation chamber through the by-pass, the pressures in said first and second actuation chambers being equal to each other and to the pressure in the delivery duct.

According to a possible embodiment, the hydraulic actuator device is configured so that, in the braking correction condition, the control unit controls the motor means to move the movable septum so as to separate fluidically the first actuation chamber from the by-pass to reduce the first volume of the first actuation chamber and to increase the second volume of the second actuation chamber to reduce the pressure in said second actuation chamber and in said delivery duct.

According to a possible embodiment, the hydraulic actuator device is connected to a hydraulic fluid tank via a channel disposed on the hydraulic actuator device upstream of the movable septum and the by-pass, in order to compensate for wear on the friction material of the braking device by introducing hydraulic fluid into the first actuation chamber.

According to a possible embodiment, the motor means comprise an electric motor and a relative connecting kinematic mechanism for the translation of the movable septum.

According to a possible embodiment, said connecting kinematic mechanism is reversible.

According to a possible embodiment, the system comprises at least one vehicle wheel lock detection sensor and/or at least one vehicle stability sensor, said sensors being operatively connected to the control unit so as to control the actuation of the motor means according to the data received from said wheel lock detection sensors and/or vehicle stability sensors.

According to a possible embodiment, said braking device comprises a disc, drum or pad brake.

According to a possible embodiment, the braking system comprises a front pilot pump with relative front manual actuation means and a rear pilot pump with relative rear manual actuation means, lever- and/or pedal-operated, each pilot pump being operatively connected to a separate front and rear hydraulic actuation device respectively,
  wherein each front and rear hydraulic actuator device is operatively connected to a separate front and rear braking device associated with a front and rear wheel of said vehicle respectively,
  wherein each front and rear hydraulic actuator device is equipped with its own front and rear motor means and is configured according to any one of the preceding claims, and wherein the system is equipped with a control unit operatively connected to the front and rear motor means of each front and rear hydraulic actuator device, so as to supervise the operation of the braking system.

The present invention, as seen, concerns also an actuation method of a vehicle braking system.

According to a possible embodiment, the actuation method of a braking system for vehicles comprises the steps of:
  providing a pilot pump (8,108,110) equipped with manual actuation means (9), lever and/or pedal-operated, the pilot pump (8,108,110) being fluidically connected to a hydraulic actuator device (12,112,114), wherein said hydraulic actuator device (12,112,114) is operatively connected to a braking device (16,116,118) associated with a wheel (5,6) of said vehicle,
  wherein the hydraulic actuator device (12,112,114) delimits a first and a second actuation chamber (20,24) separated fluidically by a septum (28) movable in an axial direction (X-X),
  wherein the first actuation chamber (20) delimits a first volume (32) which contains fluid pressurized by the pilot pump (8,108,110),
  wherein the second actuation chamber (24) delimits a second volume (36) which contains pressurized fluid, and is equipped with a delivery duct (40) fluidically connected to said braking device (16,116,118),
  characterized in that it comprises the steps of
  providing inside said hydraulic actuator device (12,112,114) a by-pass (44), configured to connect or disconnect fluidically the first actuation chamber and the delivery duct,
  providing motor means (48,148,150) connected to the movable septum (28) so that it may be translated axially, regardless of the braking action imposed by the manual actuation means (9) of the pilot pump (8,108,110),
  providing a control unit (56) operatively connected to said motor means (48,148,150) and programmed to pass from a standard operating or deactivation condition of the motor means (48,148,150), wherein the movable septum (28) places the first actuation chamber (20) in communication with the by-pass (44), with the second actuation chamber (24) and with the delivery duct (40), to a braking correction condition, wherein the motor means (48,148,150) are actuated to translate the movable septum (28) so that the first actuation chamber (20) is separated fluidically from the by-pass (44) and from the second actuation chamber (24), and so that the second actuation chamber (24) is fluidically connected to the delivery duct (40) to control the actuation of the braking device (16,116,118) via the pressurized fluid contained in the second actuation chamber (24),
wherein the movable septum (28) comprises a collar (53) and a stem (54), the collar (53) realizing the hydraulic separation between the first and second actuation chamber (20,24), the stem (54) passing through said first and second actuation chamber (20,24) and being operatively connected to the motor means (48).

According to an embodiment, a first diameter (D1) of the stem (54) inside the first actuation chamber (20) is equal to a second diameter (D2) of the stem (54) inside the second actuation chamber (24), wherein said first and second diameter (D1,D2) of the stem (54) belong respectively to a first and second section (T1,T2) of the stem (54) having an axial extension, parallel to the axial direction (X-X), not less than an axial stroke of the movable septum (28).

According to an embodiment, the stem (54) and/or the collar (53) are collectively sized so that, following the axial stroke of the movable septum (28), there is no difference between the reduction of volume available in the first actuation chamber (20) and the increase in volume in the second actuation chamber (24).

According to a possible embodiment, the hydraulic actuator device (12,112,114) is configured so that, in the rest or non-operating condition and in the standard operating condition, the obturator does not occlude the by-pass so as to allow the fluidic connection between said first and second actuation chamber through the by-pass (44), the pressures in said first and second actuation chambers (20,24) being equal to each other and to the pressure in the delivery duct (40).

According to an embodiment, the method comprises the step of configuring the hydraulic actuator device (12,112, 114) so that, in the braking correction condition, the control unit (56) controls the motor means (48,148,150) to move the movable septum (28) so as to separate fluidically the first actuation chamber (20) from the by-pass (44), and to increase the second volume (36) of the second actuation chamber (24) to reduce the pressure in said second actuation chamber (24) and in said delivery duct (40).

According to an embodiment, the method comprises the step of configuring the movable septum (28) so that the pressure in the first actuation chamber (20) is always higher than or equal to the pressure in the second actuation chamber (24).

According to an embodiment, the method comprises the step of equipping the system with at least one lock detection sensor (82) of a wheel (5,6) of the vehicle and/or at least one vehicle stability sensor (86), said sensors (82,86) being operatively connected to the control unit (56) so as to control the actuation of the motor means (48,148,150) according to the data received from said wheel lock detection and/or vehicle stability sensors (82,86).

DESCRIPTION OF THE DRAWINGS

Further features and advantages of the present invention will become more apparent from the following description provided of the preferred and non-limiting examples of embodiment thereof, wherein:

FIGS. 4a-4b represent schematic views of a prior art braking system, respectively, in a standard operating condition and in an operating condition in active mode or braking correction mode, respectively;

Figure 1:
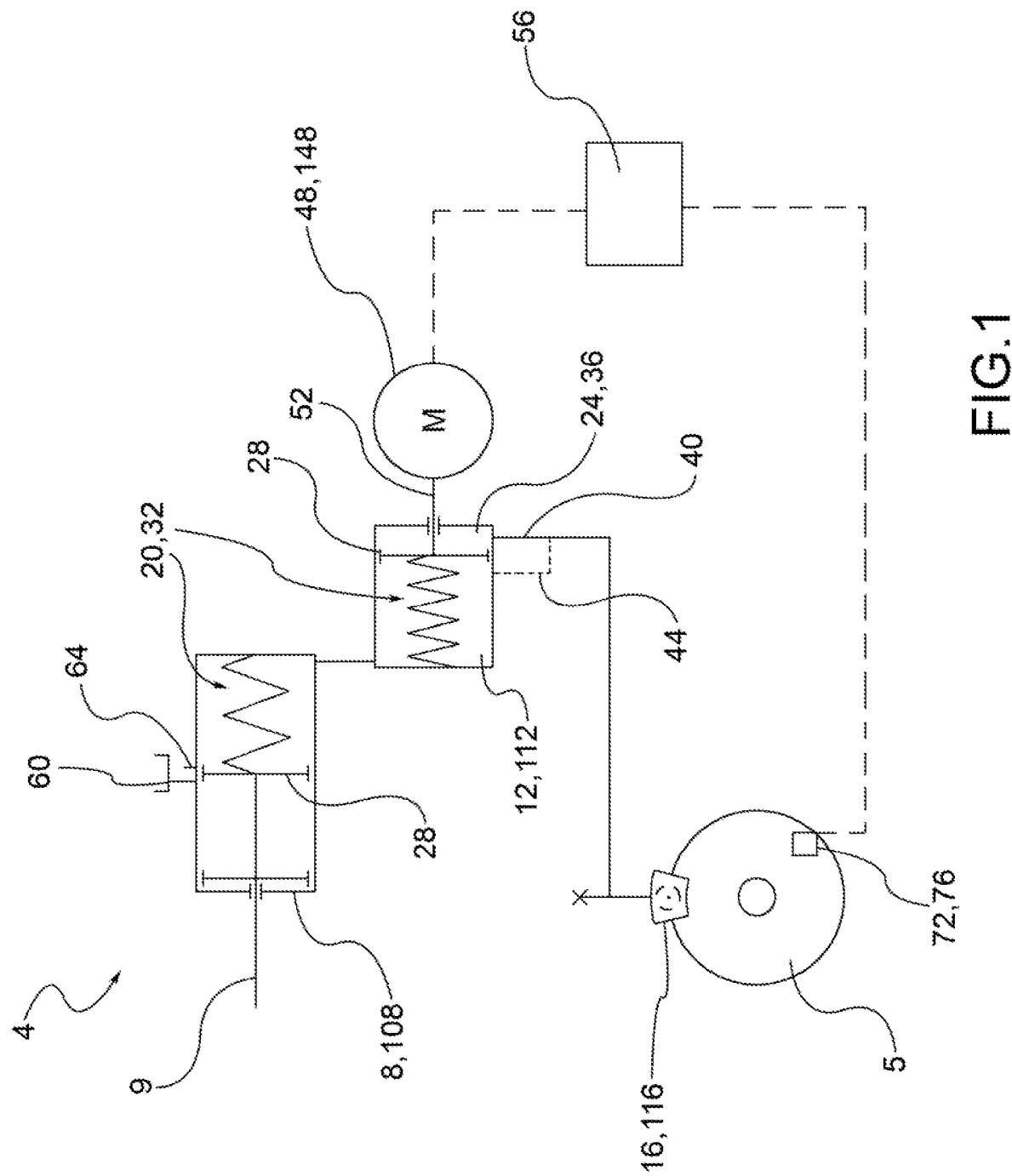
FIG. 1 shows a schematic view of a vehicle braking system according to the prior art, in a standard operating condition.

The elements or parts of elements in common between the embodiments described hereinafter will be indicated at the same numerical references.

DETAILED DESCRIPTION

With reference to the aforementioned figures, a vehicle braking system is collectively indicated at 4.

For the purposes of the present invention, "vehicles" means both cycles, such as two or more-wheeled bicycles, and motorcycles. For example, also included are cycles and motorcycles with two or more front wheels 5 and/or also two or more rear wheels 6.

Moreover, it refers to human-driven cycles, but also so-called cycles with pedal assistance or in any case equipped with auxiliary motor means.

The vehicle braking system 4 comprises a pilot pump 8 equipped with a manual actuation device 9, lever- and/or pedal-operated, which is fluidically connected to a hydraulic actuator device 12.

The pilot pump 8 comprises a movable septum or float 28 operatively connected to the manual actuation means 9.

The hydraulic actuator device 12 is operatively connected to a braking device 16 associated with a wheel 5,6 of said vehicle.

For example, the braking device 16 comprises a disc brake, or drum brake, or pad brake, associated with a wheel 5,6 of the vehicle.

The hydraulic actuator device 12 delimits a first and a second actuation chamber 20,24 separated fluidically by a septum 28 movable in an axial direction X-X.

The first actuation chamber 20 delimits a first volume 32 containing fluid pressurized by the pilot pump 8 by means of the manual actuation means 9 and the float or movable septum 28; the second actuation chamber 24 delimits a second volume 36 containing pressurized fluid and is equipped with a delivery duct 40 fluidically connected to said braking device 16.

The delivery duct 40 thus sends pressurized fluid to actuate said braking device 16.

Advantageously, the hydraulic actuator device 12 comprises a by-pass 44 configured to connect or disconnect fluidically the first actuation chamber 20 and the delivery duct 40, as well as the second actuation chamber 24.

The movable septum 28 is connected to motor means 48 so that it may translate axially, regardless of the braking action imposed by the pilot pump 8 via the manual actuation means 9.

According to an embodiment, the motor means 48 comprise an electric motor and a relative connecting kinematic mechanism 52 for the controlled translation of the movable septum 28.

In operating conditions of the system, the position of the movable septum 28 is maintained by powering and controlling the motor means 48.

The movable septum 28 comprises a collar 53 and a stem 54, wherein the collar 53 provides the hydraulic separation between the first and second actuation chamber 20,24. The stem 54 passes through said first and second actuation chamber 20,24 and is operatively connected to the motor means 48.

According to an embodiment, a diameter of the collar 53 is greater than a diameter of the stem 54, said diameters being measured on a cross-section plane perpendicular to the axial direction X-X.

Preferably, a first diameter D1 of the stem 54 inside the first actuation chamber 20 is equal to a second diameter D2 of the stem 54 inside the second actuation chamber 24.

Said first and second diameter D1, D2 of the stem 54 belong respectively to a first and second portion T1, T2 of the stem having axial extension, parallel to the axial direction X-X, not less than an axial stroke of the movable septum 28.

The stem 54 and/or the collar 53 are collectively sized so that, following the axial stroke of the movable septum 28, there is no difference between the reduction of volume available in the first actuation chamber 20 and the increase in volume in the second actuation chamber 24.

The vehicle braking system 4 of the present invention comprises a control unit 56 which is operatively connected with said motor means 48 and programmed to pass from a standard operating or deactivation condition of the motor means 48 to a braking correction condition wherein the motor means 48 are activated.

In particular, in said standard operating or deactivation condition of the motor means 48, the movable septum 28 places the first actuation chamber 20 in connection with the by-pass 44, with the second actuation chamber 24 and then with the delivery duct 40.

In said braking correction condition the motor means 48 are actuated to translate the movable septum 28 so that the first actuation chamber 20 is fluidically separated from the by-pass 44 and from the second actuation chamber 24, and so that the second actuation chamber 24 is fluidically connected to the delivery duct 40 to control the actuation of the braking device 16 via the pressure fluid contained in the second actuation chamber 24.

The hydraulic actuator device 12 is configured in such a way that, in rest or non-operating condition, and in standard operating condition, the movable septum 28 is positioned so as not to occlude the by-pass 44 to allow the fluid connection between said first and second actuation chamber 20,24 through the by-pass 44.

The delivery duct 40 thus allows the fluid connection between said first and second actuation chamber 20,24 through the by-pass 44; in this way the pressures in said first and second actuation chamber 20,24 are equal to each other and to the pressure in the delivery duct 40.

Moreover, the hydraulic actuator device 12 is configured so that, in the braking correction condition, the control unit 56 controls the motor means 48 to move the movable septum 28 so as to separate fluidically the first actuation chamber 20 from the by-pass 44, to reduce the volume of the first actuation chamber 20 and to increase the volume of the second actuation chamber 24 to reduce the pressure in said second actuation chamber 24 and, consequently, in said delivery duct 40.

According to an embodiment, the hydraulic actuator device 12 is connected to a hydraulic fluid tank 60 via a channel 64 arranged on the hydraulic actuator device 12, upstream of the movable septum 28 and the by-pass 44, so as to compensate for wear on the friction material of the braking device 16 by introducing hydraulic fluid into the first actuation chamber 20.

Preferably, the movable septum 28 is configured so that the pressure in the first actuation chamber 20 is always higher than or equal to the pressure in the second actuation chamber 24.

According to an embodiment, the movable septum 28 comprises a lip type gasket 68, which may be elastically deformed to ensure said pressure difference between the first and second actuation chambers 20,24: in other words, the lip type gasket 68 deforms to prevent the pressure in the second actuation chamber 24 from being higher than the pressure in the first actuation chamber 20.

In other words, the lip gasket 68 is configured so that the actuation chambers 20,24 are fluidically disconnected from each other until the pressure in the first actuation chamber 20 is greater than or equal to the pressure in the second actuation chamber 24; otherwise the lip lowers and the actuation chambers 20,24 return to being communicating (until the above condition is met).

For example, the collar 53 comprises an annular seat 57 which houses said lip gasket 68.

According to a possible embodiment, the movable septum 28 is equipped with a compensation valve 72 calibrated so that the pressure in the first actuation chamber 20 is always higher than or equal to the pressure in the second actuation chamber 24.

The compensation valve 72 may be provided either as an alternative to or alongside the lip gasket 68, in order to ensure that, in all operating conditions and also as a result of wear on any lip gasket 68, the pressure in the first actuation chamber 20 is always higher than or equal to the pressure in the second actuation chamber 24.

The compensation valve 72 may perform the by-pass function 44.

For example, the compensation valve 72 comprises an obturator 76 configured so as to ensure that the pressure in the first actuation chamber 20 is always higher than or equal to the pressure in the second actuation chamber 24.

For example, the obturator is equipped with a stop 80 and elastic calibration means 84 which elastically influence said stop 80 to rest on a contrast pin 88.

The by-pass function occurs as follows. As long as the obturator 76 is not in abutment on the contrast pin 88, no by-pass is created: therefore, the first actuation chamber 20 is fluidically disconnected from the delivery duct 40. Following the translation of the float 28, the obturator 76 is brought into abutment against the contrast pin 88: in this way, due to the elasticity of the elastic means 84, the obturator retracts, and a fluid through opening is made that allows the by-pass between the first and second actuation chamber 20,24 to be created. Thus, the by-pass 44 is represented by a coaxial duct within the movable septum 28.

According to a possible embodiment, the obturator 76 is equipped with a stop 80 and elastic calibration means 84 that elastically influence said stop 80 to rest against a conical surface 92.

The by-pass function occurs as follows.

As long as the obturator 76 is in abutment on the conical surface 92, no by-pass is created because the contact between the obturator 76 and the conical surface 92 provides a hydraulic seal and does not allow the fluid connection to be made between the opening and the second actuation chamber 20,24, as well as between the first actuation chamber 20 and the delivery duct 40.

Following the displacement of the obturator 76 by the motor means 48, the same obturator is detached from the conical surface 92 and the through opening created forms the by-pass 44 that allows the fluid connection between the first actuation chamber 20, the delivery duct 40 and the second actuation chamber 24.

As seen, the motor means 48 comprise an electric motor and a relative connecting kinematic mechanism 52 for the controlled translation of the movable septum 28.

Preferably, the connecting kinematic mechanism 52 is reversible. This reversibility condition represents a safety condition: in effect, the float 28 is pushed back until the obturator 76 abuts with the contrast pin 88, thus detaching itself from the float 28 and creating in this way the by-pass 44 coaxially to the same float.

According to an embodiment, the vehicle braking system 4 comprises at least one wheel lock detection sensor 82 of the vehicle and/or at least one vehicle stability sensor 86, said sensors 82,86 being operatively connected to the control unit 56 so as to control the actuation of the motor means 48 according to the data received from said wheel lock detection sensors 82 and/or vehicle stability sensors 86.

For example, if one or more of said sensors 82,86 detects a condition of dynamic instability of the vehicle, such as the locking of a wheel 5,6, lifting of the rear wheel 6 or a skid, it communicates this condition to the control unit 56 which accordingly controls the motor means 48 to reduce braking on the wheel or wheels 5,6 that are triggering the instability of the vehicle.

It should be noted that, in the accompanying figures, the wheel lock detection sensors 82 of the vehicle and/or the stability sensors 86 of the vehicle have been schematically indicated at the wheels of the vehicle. Such positioning is purely indicative and schematic and should not be considered in any way restrictive.

The motor vehicles 48 move the movable septum 28 in such a way as to fluidically separate the delivery duct 40 from the first actuation chamber 20, the first volume 32 of which is reduced; at the same time the second volume 36 of the second actuation chamber 24 is increased in order to reduce the inner pressure of said second actuation chamber 24 and thus the pressure within the delivery duct 40. In this way, the braking action on the braking device 16 fluidically connected to said delivery duct 40 is reduced, eliminating the cause of the dynamic instability of the vehicle.

The vehicle braking system of the present invention may be implemented in various embodiments.

It should be noted that the vehicle braking system 4 according to the present invention may comprise a plurality of pilot pumps and relative hydraulic actuators and braking devices, connected to separate wheels 5,6 of the vehicle.

For example, the braking system 4 comprises a front pilot pump 108 with relative front manual actuation means 9 and a rear pilot pump 110 with relative rear manual actuation means 9, lever- and/or pedal-operated, each pilot pump 108,110 being operatively connected to a separate front 112 and rear 114 hydraulic actuation device respectively, Each front and rear hydraulic actuator device 112,114 is operatively connected to a separate front 116 and rear 118 braking device associated with a front 5 and rear 6 wheel of said vehicle respectively.

Moreover, each front and rear hydraulic actuator device 112,114 is equipped with its own front and rear motor means 148,150.

The system is also equipped with a control unit 56 operatively connected to the front and rear motor means 148,150 of each front and rear hydraulic actuator device 112,114, so as to supervise the operation of the braking system 4. According to an embodiment, said control unit 56 is unique in order to globally supervise the dynamic behavior of the vehicle by acting on all the braking devices on the vehicle. It is also possible to envisage separate control units 56.

Moreover, it is also possible to envisage a mixed system, wherein there is a simultaneous presence of a braking system according to the present invention, applied to at least one wheel of the vehicle, and a traditional braking system applied to at least one other wheel of the vehicle.

In addition, the braking system according to the present invention may be retrofitted as a kit to an existing system.

The operation of a vehicle braking system according to the present invention will now be described.

In particular, as seen, the braking system of the present invention provides for two operating conditions, namely a standard operating condition, wherein the system does not perform any intervention or correction on the braking action requested by the user, and an active operating condition or braking correction, wherein the system intervenes by modifying the braking action requested by the user in order to improve the dynamic stability of the vehicle.

Figure 2:
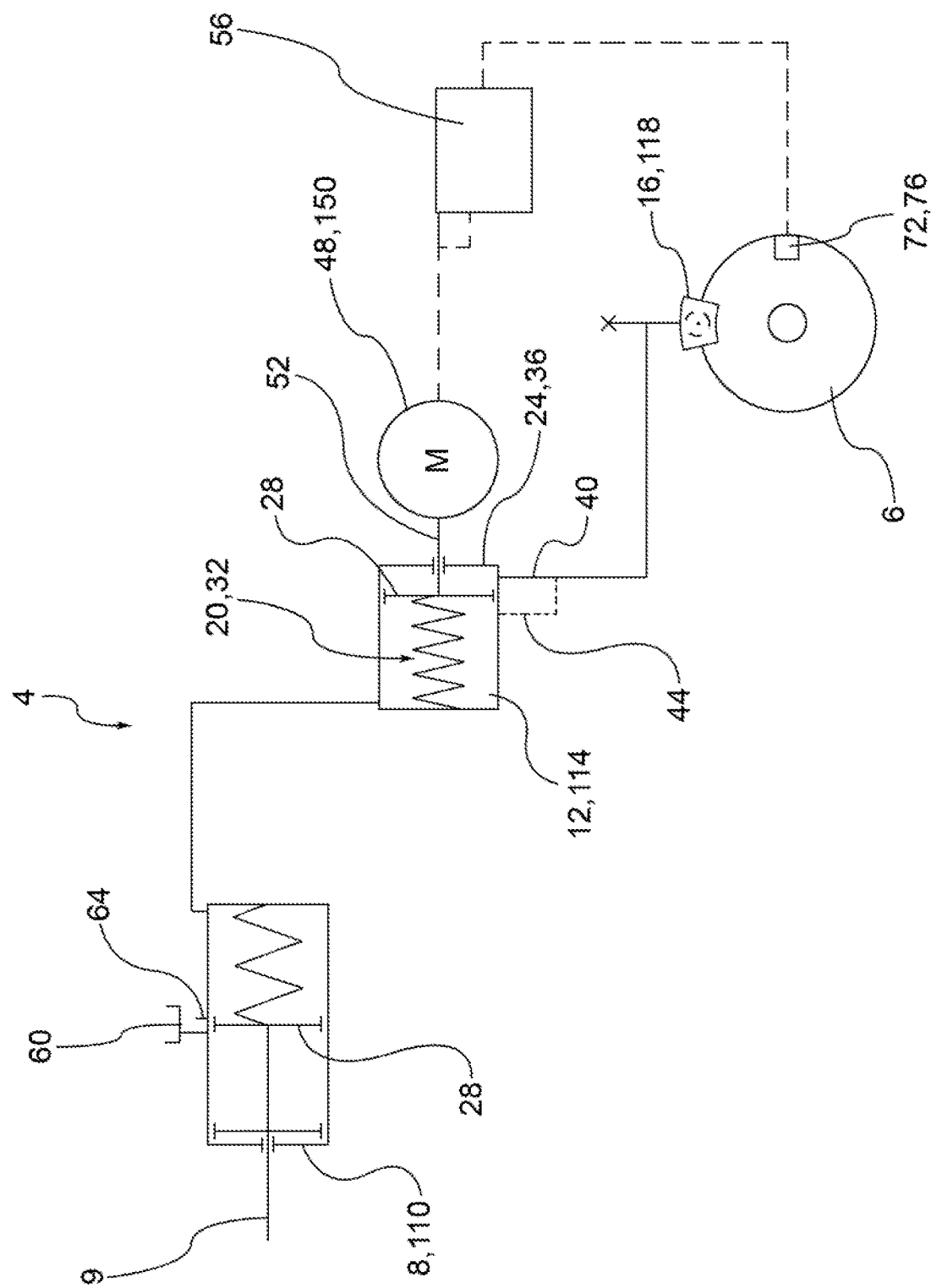
FIG. 2 shows a schematic view of a vehicle braking system according to the prior art, in a standard operating condition.
Figure 3:
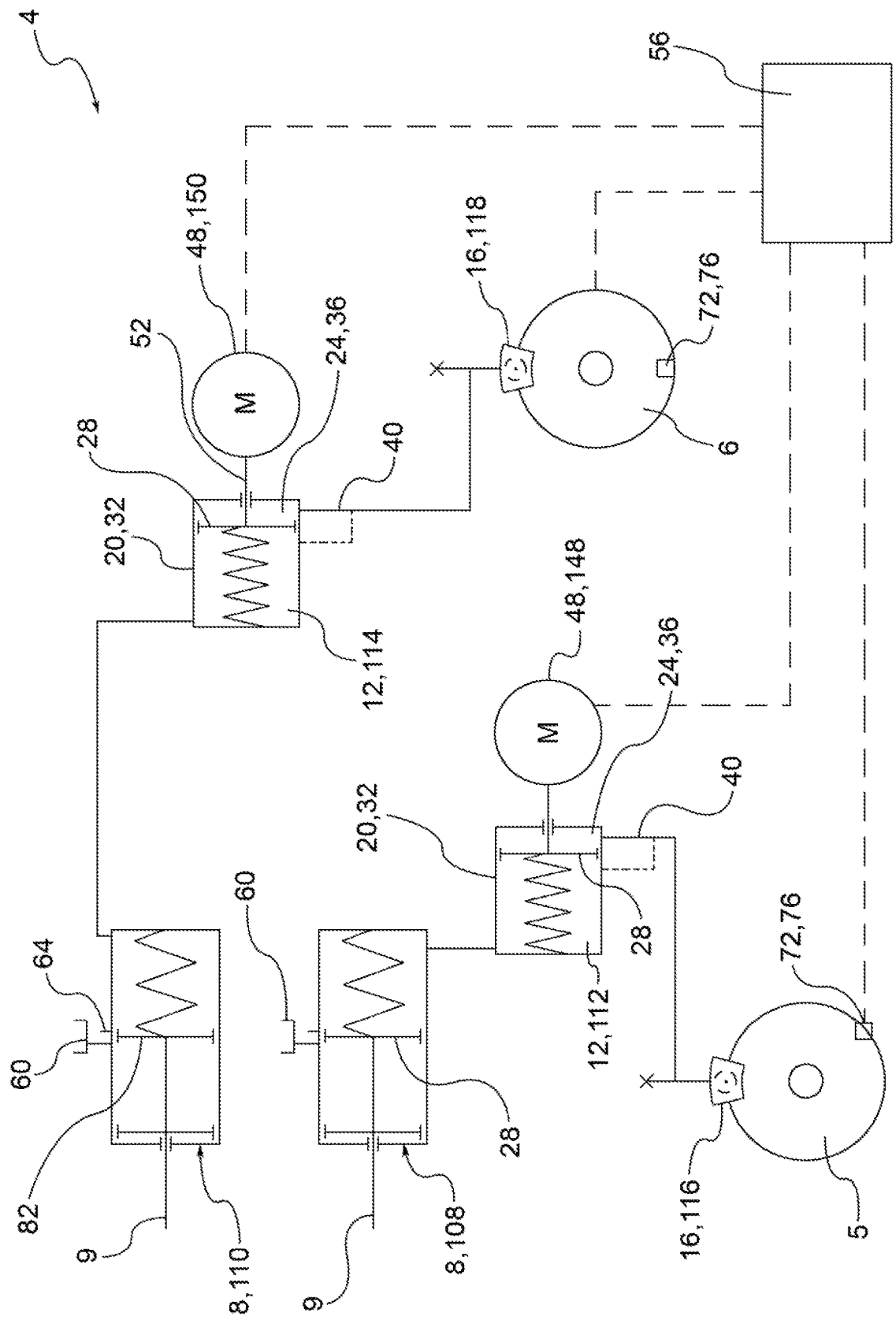
FIG. 3 shows a schematic view of a vehicle braking system according to a further embodiment of the prior art, in a standard operating condition.
Figure 5:
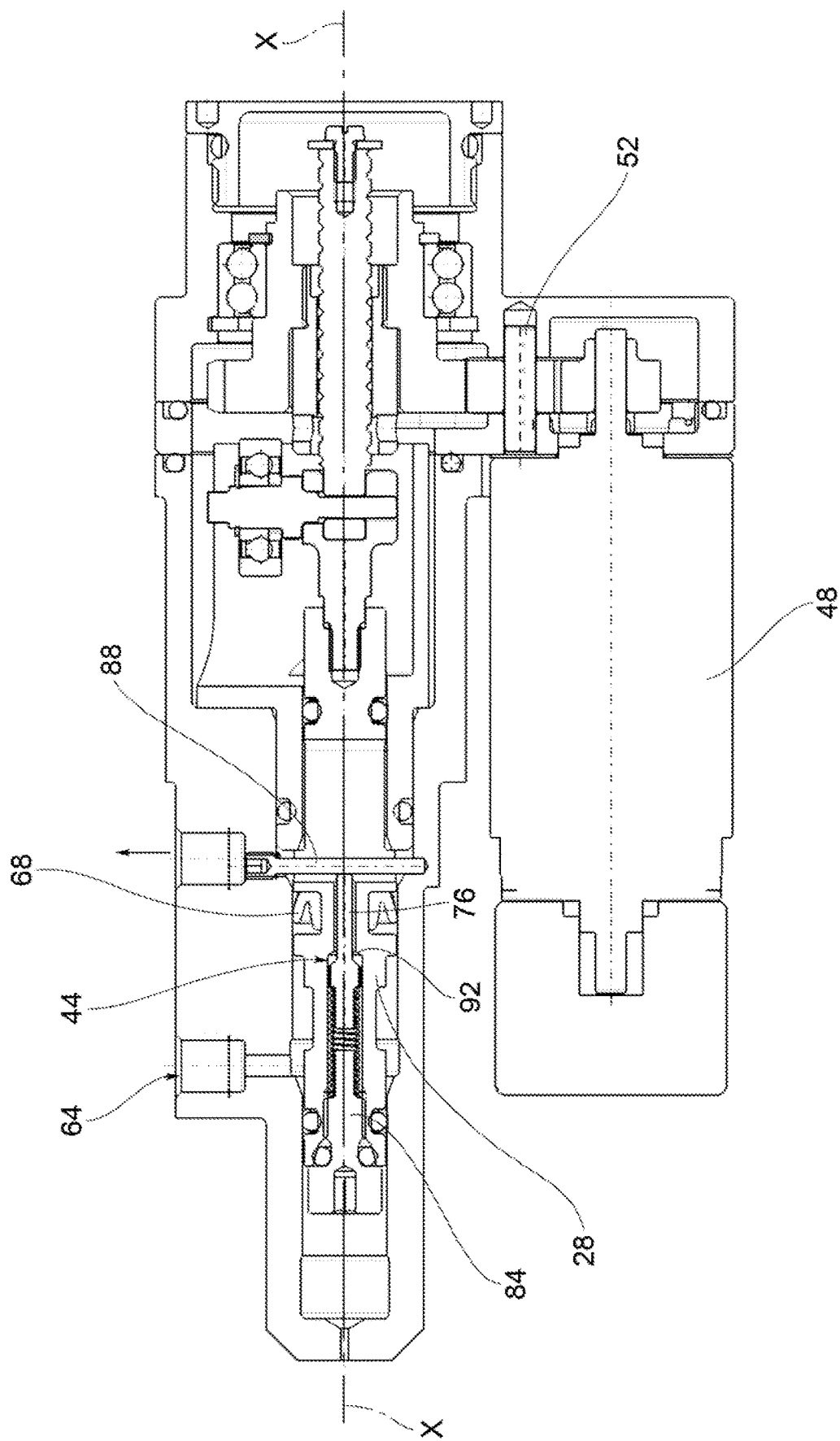
FIG. 5 shows a cross-section view of the actuator interposed between the pilot pump and the braking device according to an embodiment of the present invention, in standard operating conditions.
Figure 6:
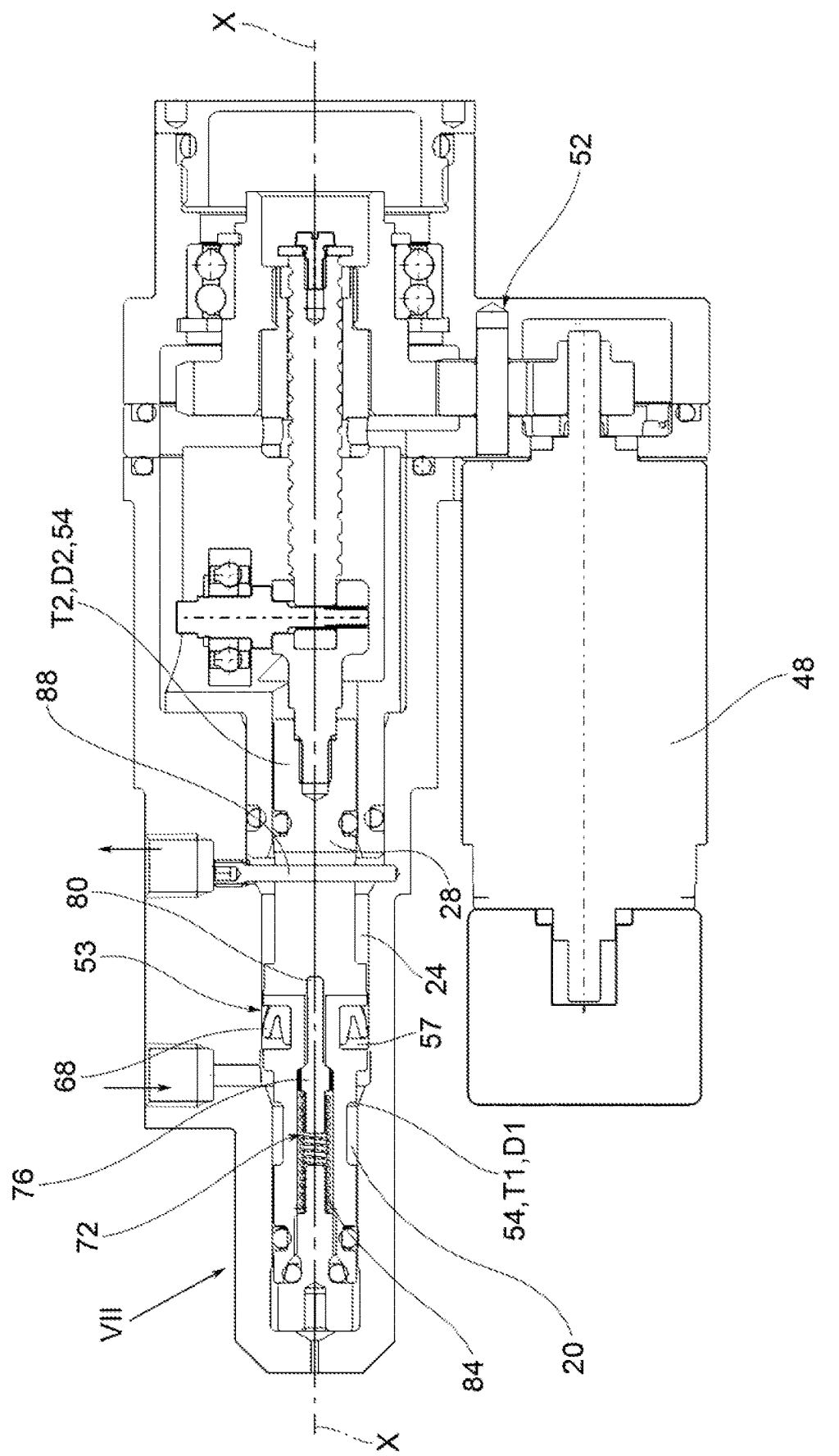
FIG. 6 represents a cross-section view of the pilot pump in FIG. 5, in braking correction condition.
Figure 7:
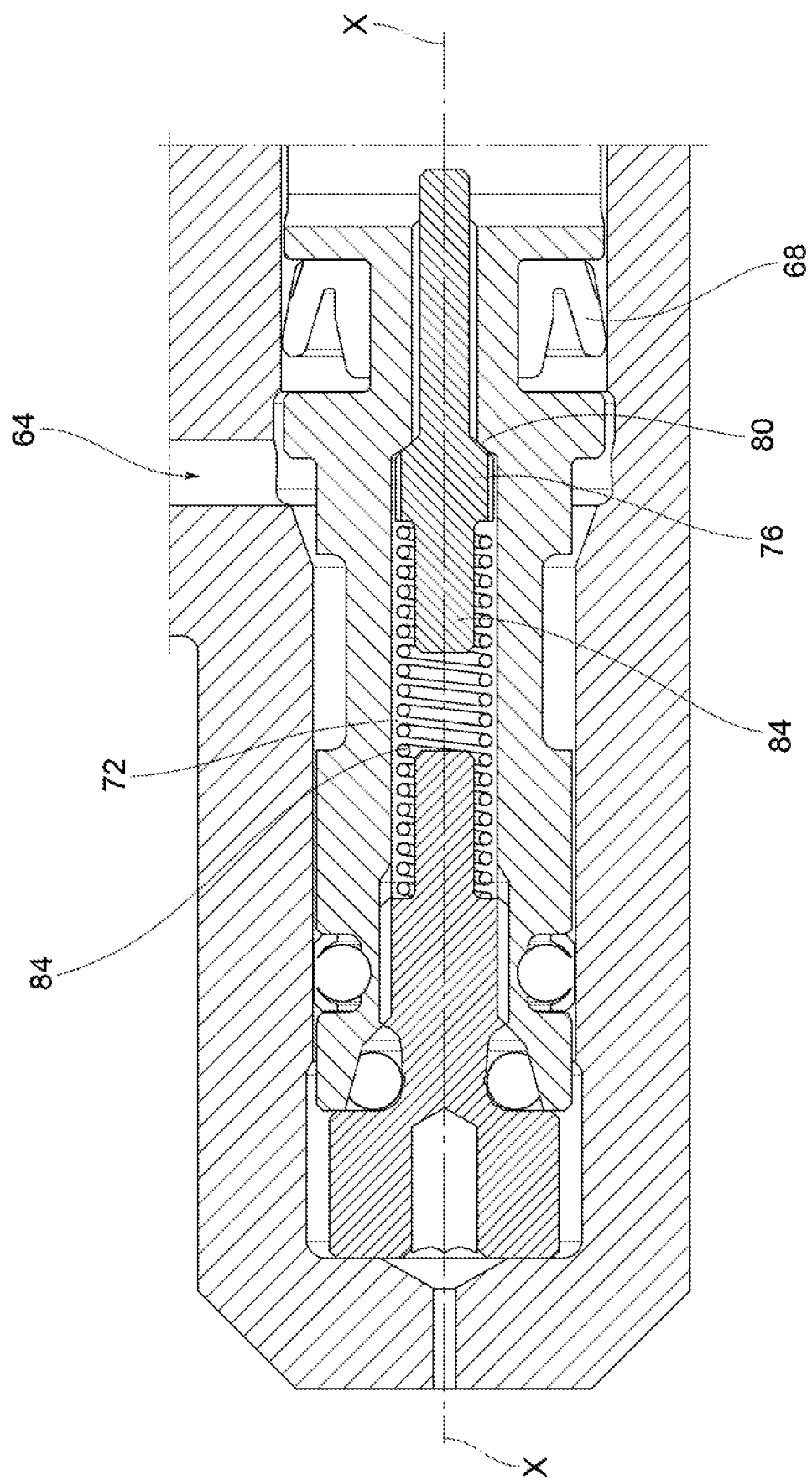
FIG. 7 shows the enlarged detail VII shown in FIG. 6.

During the standard operating condition, illustrated for example in FIGS. 1,2,3,4*a*, the force exerted by the rider on the float of the pilot pump, whether lever- or pedal-operated, pushes the brake fluid of the first actuation chamber of the hydraulic actuator device. In such standard condition, the motor means are deactivated and the first and second actuation chambers are fluidically connected to each other via the by-pass. The movable septum is then by-passed, and the pressurized brake fluid is sent into the delivery duct and, via this, to the braking device.

In this condition, braking occurs by direct action of the driver, exactly as in the systems of the known type: in effect, it is the driver who establishes the delivery pressure of the fluid in the delivery duct through his direct action on the manual actuation means 9, whether lever- or pedal-operated. This is due to the fact that the pressure in the first delivery chamber, which is directly proportional to the user's action on the manual actuation means 9, coincides with the pressure in the second delivery chamber, due to the by-pass which connects the first and second delivery chambers fluidically.

As seen, the control unit is able to monitor and thus prevent the incipience of a condition of instability of the vehicle, due to, for example, the locking of one or more wheels 5,6, the lifting of the rear wheel 6 with the relative risk of the vehicle turning over, or the misalignment between the front wheel 5 and the rear wheel 6 that occurs, for example, in case of skidding, in the event of locking of the rear wheel 6.

During the braking correction condition (FIG. 4*b*), the control unit first detects an abnormal braking condition, i.e. a braking condition requested by the user which compromises the dynamic stability of the vehicle, determined according to predetermined parameters.

Once such abnormal condition has been detected, the control unit decides to intervene, i.e. to correct the braking via the motor means.

In this operating condition, the driver's force exerted on the float of the pilot pump, through the manual actuation means 9, pushes the brake fluid into the first actuation chamber of the hydraulic actuator device. The control unit, once a critical condition has been detected, commands the motor means to translate the movable septum so that the first actuation chamber is fluidically separated from the by-pass and from the second actuation chamber, and so that the second actuation chamber is fluidically connected to the delivery duct to control the actuation of the braking device via the pressure fluid contained in the second actuation chamber.

The user's action is then by-passed since the fluid in the first actuation chamber is fluidically disconnected from the delivery duct; thus, the first and second actuation chambers are fluidically disconnected from each other.

In other words, the lip gasket is configured so that the actuation chambers are fluidically disconnected from each other until the pressure in the first actuation chamber is greater than or equal to the pressure in the second actuation chamber; otherwise the lip lowers, and the actuation chambers are again communicating (until the above condition is met).

As seen, as an alternative or in addition to the lip gasket, the compensation valve may be used, which is calibrated so as to open automatically so as to always ensure the condition according to which the pressure in the first actuation chamber is greater than or equal to the pressure in the second actuation chamber.

In this configuration, the volume of the first actuation chamber is reduced by the displacement of the movable septum, and thus the manual actuation means 9 is pushed back relative to the position initially set by the user, who consequently receives immediate feedback on the intervention of the braking correction.

In addition, the volume of the second actuation chamber is increased by the displacement of the movable septum: in this way, the pressure in the second actuation chamber, and thus in the delivery duct, is reduced and with it the braking action of the corresponding braking device is reduced until the control unit detects that the critical dynamic condition of the vehicle has ceased.

As seen, the stem and/or the collar are collectively sized so that, following the axial stroke of the movable septum, there is no difference between the reduction of the volume available in the first actuation chamber and the increase in volume in the second actuation chamber.

In this way, in the first portion of the stroke of the float, wherein the float has not blocked the by-pass, there is no risk of an increase in pressure due to the fact that the volume of brake fluid removed from the first actuation chamber is greater than the volume of fluid drawn in by the second actuation chamber.

In other words, in the absence of the stem passing through the two chambers or, in any case, in the absence of an appropriate sizing of the float portions that pass through the two actuation chambers, the condition would occur whereby the volume of brake fluid removed from the first actuation chamber is greater than the volume of fluid drawn in by the second actuation chamber: such condition would result in an increase in the delivery pressure to the braking devices. This condition, even if short and limited to the first stroke portion of the float, would cause dynamic instability as it would increase the braking action in a condition of incipience of instability due to an excess of braking. In other words, the braking device would momentarily increase the braking action in a condition wherein such action should be reduced. Due to the appropriate sizing of the float, this condition is avoided, and the displacement of the float does not lead to undesirable pressure variations between the two actuation chambers.

At the end of such critical condition, the system returns to the standard operating condition wherein the braking devices are directly controlled by the action exerted by the user on the pilot pump through the manual actuation means 9.

As may be appreciated from the foregoing, the vehicle braking system according to the invention allows the disadvantages of the prior art to be overcome.

In particular, the system is able to actively intervene on the braking action of the vehicle imposed by the user and to correct it promptly in order to prevent the locking of one or more wheels of the vehicle as well as to improve the stability of the vehicle. "Improvement of vehicle stability" means the possibility of reducing the braking action imposed by the user on one or more wheels, for example to prevent the lifting of the rear wheel and the possible overturning of the vehicle or to prevent the misalignment of the wheels of the vehicle following yawing of the same.

In other words, the braking system is able to reduce or even reset the braking action imposed by the user on one or more wheels of the vehicle, in order to improve the dynamic stability thereof.

The system acts promptly in a repeatable and reliable manner.

The braking system of the present invention has a relatively low cost and involves a completely limited and therefore acceptable weight increase of the vehicle compared to the solutions of the prior art.

Advantageously, the system according to the present invention is able to warn the rider of its braking correction intervention: in this way the rider receives feedback through the manual actuation means, whether lever- or pedal-operated, and may, for example, notice that his driving mode is incorrect and then change it accordingly. Such feedback, as seen, consists of a reaction to the manual control that not only opposes the intensification of the braking action but tends to reduce it by returning the manual control to a position with less braking demand.

A person skilled in the art, in the object of satisfying contingent and specific requirements, may make numerous modifications and variations to the braking systems and methods of implementation of braking systems for vehicles described above, all of which are within the scope of the invention as defined by the following claims.

The invention claimed is:
1. A braking system for vehicles, comprising:
a pilot pump equipped with a lever- and/or pedal-operated manual actuation device, which is fluidically connected to a hydraulic actuator device which is operatively connected to a braking device associated with a wheel of said vehicle,
wherein the hydraulic actuator device delimits a first and a second actuation chamber separated fluidically by a septum movable in an axial direction,
wherein the first actuation chamber delimits a first volume which contains fluid pressurized by the pilot pump via the manual actuation device,
wherein the second actuation chamber delimits a second volume which contains pressurized fluid and is equipped with a delivery duct fluidically connected to said braking device,
wherein
the hydraulic actuator device comprises a by-pass, configured to fluidically connect or disconnect the first actuation chamber and the delivery duct,
the movable septum is connected to a motor device so that it may translate axially, regardless of the braking action imposed by the pilot pump via the manual actuation device,
the system comprising a control unit operatively connected with said motor device and programmed to switch from a standard operating condition or deactivation of the motor device, wherein the movable septum places in communication the first actuation chamber with the by-pass, with the second actuation chamber and with the delivery duct, to a braking correction condition wherein the motor device are actuated to translate the movable septum so that the first actuation chamber is separated fluidically from the delivery duct, and so that the second actuation chamber is fluidically connected to the delivery duct to control the actuation of the braking device via the pressurized fluid contained in the second actuation chamber,
wherein the movable septum comprises a collar and a stem, the collar realizing the hydraulic separation between the first and second actuation chamber, the stem passing through said first and second actuation chamber and being operatively connected to the motor device, wherein said movable septum comprises an elastically deformable lip type gasket so as to ensure said pressure difference between the first and the second actuation chamber,
wherein the collar comprises an annular seat which houses said gasket.

2. The braking system for vehicles according to claim 1, wherein a collar diameter is greater than a stem diameter, said diameters being measured on a cross-section plane perpendicular to the axial direction.

3. The braking system for vehicles according to claim 1, wherein a first diameter of the stem inside the first actuation chamber is equal to a second diameter of the stem inside the second actuation chamber.

4. The braking system for vehicles according to claim 3, wherein said first and second diameter of the stem belong respectively to a first and second portion of the stem having an axial extension, parallel to the axial direction, not less than an axial stroke of the movable septum.

5. The braking system for vehicles according to claim 1, wherein the stem and/or the collar are dimensioned overall so that, following the axial stroke of the movable septum, there is no difference between the reduction of volume available in the first actuation chamber and the increase in volume in the second actuation chamber.

6. The braking system for vehicles according to claim 1, wherein said movable septum is configured so that the pressure in the first actuation chamber is always greater than or equal to the pressure in the second actuation chamber.

7. The braking system for vehicles according to claim 1, wherein the movable septum is equipped with a compensation valve calibrated so that the pressure in the first actuation chamber is always greater than or equal to the pressure in the second actuation chamber.

8. The braking system for vehicles according to claim 7, wherein the compensation valve comprises an obturator configured to ensure that the pressure in the first actuation chamber is always greater than or equal to the pressure in the second actuation chamber.

9. The braking system for vehicles according to claim 8, wherein said obturator is equipped with a stop and elastic calibration means which elastically influence said stop to rest on a contrast pin.

10. The braking system for vehicles according to claim 8, wherein said obturator is equipped with a stop and elastic calibration means which elastically influence said stop to rest against a conical surface.

11. The braking system for vehicles according to claim 1, wherein the hydraulic actuator device is configured so that, in a rest or non-operating condition and in the standard operating condition, an obturator does not occlude the by-pass so as to allow the fluidic connection between said first and second actuation chamber through the by-pass, the pressures in said first and second actuation chambers being equal to each other and to the pressure in the delivery duct.

12. The braking system for vehicles according to claim 1, wherein the hydraulic actuator device is configured so that, in the braking correction condition, the control unit commands the motor device to move the movable septum so as to separate fluidically the first actuation chamber from the by-pass, to reduce the first volume of the first actuation chamber and to increase the second volume of the second actuation chamber to reduce the pressure in said second actuation chamber and in said delivery duct.

13. The braking system for vehicles according to claim 1, wherein the hydraulic actuator device is connected to a hydraulic fluid tank by a channel placed on the hydraulic actuator device upstream of the movable septum and of the by-pass, so as to allow compensation of the wear of the friction material of the braking device by the introduction of hydraulic fluid in the first actuation chamber.

14. The braking system for vehicles according to claim 1, wherein the motor device comprise an electric motor and a relative connecting kinematic mechanism for translating the movable septum.

15. The braking system for vehicles according to claim 14, wherein said connecting kinematic mechanism is of the reversible type.

16. The braking system for vehicles according to claim 1, wherein the system comprises at least one wheel lock detection sensor of the vehicle and/or at least one vehicle stability sensor, said sensors being operatively connected to the control unit so as to control the actuation of the motor device according to the data received from said wheel lock detection sensors and/or vehicle stability sensors.

17. The braking system for vehicles according to claim 1, wherein said braking device comprises a disc, drum or shoe brake.

18. The braking system for vehicles according to claim 1, wherein the braking system comprises a front pilot pump with a relative manual actuation device and a rear pilot pump with a relative lever- and/or pedal-operated rear manual actuation device, wherein each pilot pump being operatively connected to a separate front and rear hydraulic actuator device respectively,
wherein each front and rear hydraulic actuator device is operatively connected to a separate front and rear braking device associated with a front and rear wheel of said vehicle respectively,
wherein each front and rear hydraulic actuator device is equipped with its own front and rear motor devices, and
wherein the system is equipped with a control unit operatively connected to the front and rear motor device of each front and rear hydraulic actuator device, so as to supervise the operation of the braking system.

19. An actuation method of a braking system for vehicles, comprising the steps of:
providing a pilot pump equipped with a lever- and/or pedal-operated manual actuation device, the pilot pump being fluidically connected to a hydraulic actuator device, wherein said hydraulic actuator device is operatively connected to a braking device associated with a wheel of said vehicle,
wherein the hydraulic actuator device delimits a first and a second actuation chamber separated fluidically by a septum movable in an axial direction,
wherein the first actuation chamber delimits a first volume which contains fluid pressurized by the pilot pump,
wherein the second actuation chamber delimits a second volume which contains pressurized fluid, and is equipped with a delivery duct fluidically connected to said braking device, wherein it comprises the steps of
providing, within said hydraulic actuator device, a by-pass, configured to fluidically connect or disconnect the first actuation chamber and the delivery duct,
providing a motor device connected to the movable septum so that it may be translated axially, regardless of the braking action imposed by the manual actuation device of the pilot pump,
providing a control unit operatively connected to said motor device and programmed to switch from a standard operating or deactivation condition of the motor device, wherein the movable septum places in communication the first actuation chamber with the by-pass, with the second actuation chamber and with the delivery duct, to a braking correction condition wherein the motor device is actuated to translate the movable septum so that the first actuation chamber is separated fluidically from the by-pass and from the second actuation chamber, and so that the second actuation chamber is fluidically connected to the delivery duct to control the actuation of the braking device via the pressurized fluid contained in the second actuation chamber, wherein the movable septum comprises a collar and a stem, the collar realizing the hydraulic separation between the first and second actuation chamber, the stem passing through said first and second actuation chamber and being operatively connected to the motor device, wherein said movable septum comprises an elastically deformable lip type gasket so as to ensure a pressure difference between the first and the second actuation chamber, wherein the collar comprises an annular seat which houses said gasket.

20. The actuation method of a braking system for vehicles according to claim 19, wherein a first diameter of the stem inside the first actuation chamber is equal to a second diameter of the stem inside the second actuation chamber, wherein said first and second diameter of the stem belong respectively to a first and second portion of the stem having an axial extension, parallel to the axial direction, not less than an axial stroke of the movable septum.

21. The actuation method of a braking system for vehicles according to claim 19, wherein the stem and/or the collar are dimensioned overall so that, following the axial stroke of the movable septum, there is no difference between the reduction of volume available in the first actuation chamber and the increase in volume in the second actuation chamber.

22. The actuation method of a braking system for vehicles according to claim 19, comprising the step of configuring the hydraulic actuator device so that, in a rest or non-operating condition and in the standard operating condition, an obturator does not occlude the by-pass so as to allow the fluidic connection between said first and second actuation chamber through the by-pass, the pressures in said first and second actuation chambers being equal to each other and to the pressure in the delivery duct.

23. The actuation method of a braking system for vehicles according to claim 19, comprising the step of configuring the hydraulic actuator device so that, in the braking correction condition, the control unit commands the motor device to move the movable septum so as to separate fluidically the first actuation chamber from the by-pass, and to increase the second volume of the second actuation chamber to reduce the pressure in said second actuation chamber and in said delivery duct.

24. The actuation method of a braking system for vehicles according to claim 19, comprising the step of configuring the movable septum so that the pressure in the first actuation chamber is always greater than or equal to the pressure in the second actuation chamber.

25. The actuation method of a braking system for vehicles according to claim 19, comprising the step of providing the system with at least one locking detection sensor of a wheel of the vehicle and/or at least one vehicle stability sensor, said sensors being operatively connected to the control unit so as to control the actuation of the motor device according to the data received from said wheel lock detection and/or vehicle stability sensors.

* * * * *